J. B. JORDAN.
FLEXIBLE SLED.
APPLICATION FILED JAN. 28, 1915.
1,226,672.
Patented May 22, 1917.
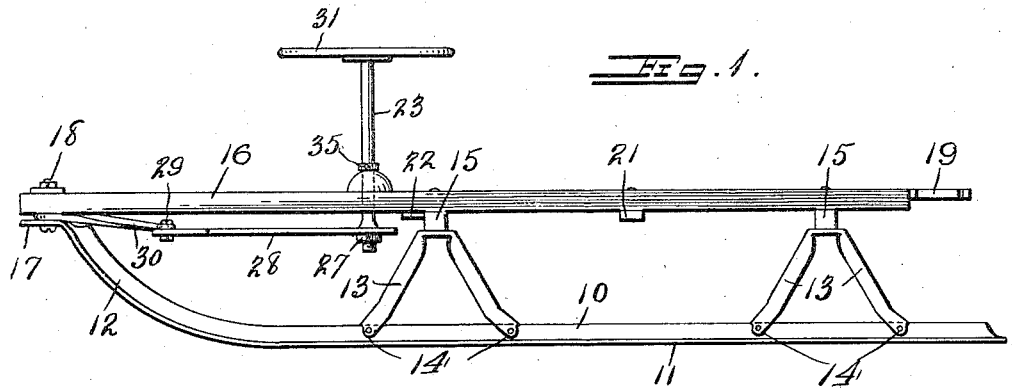
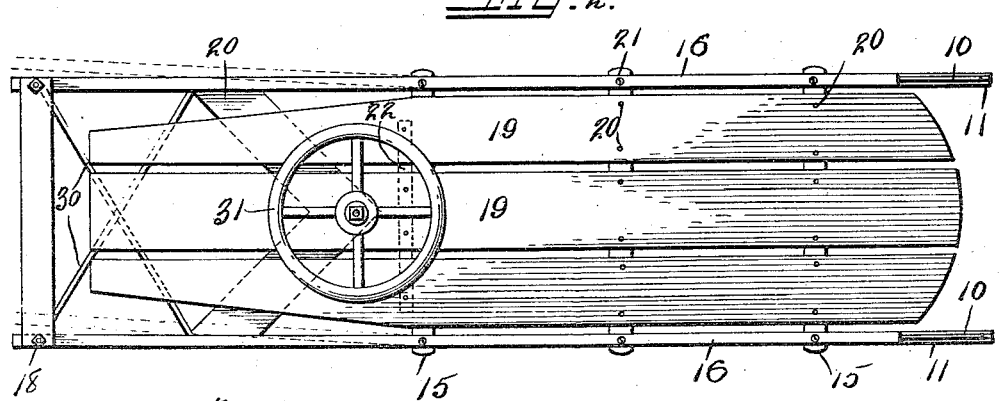
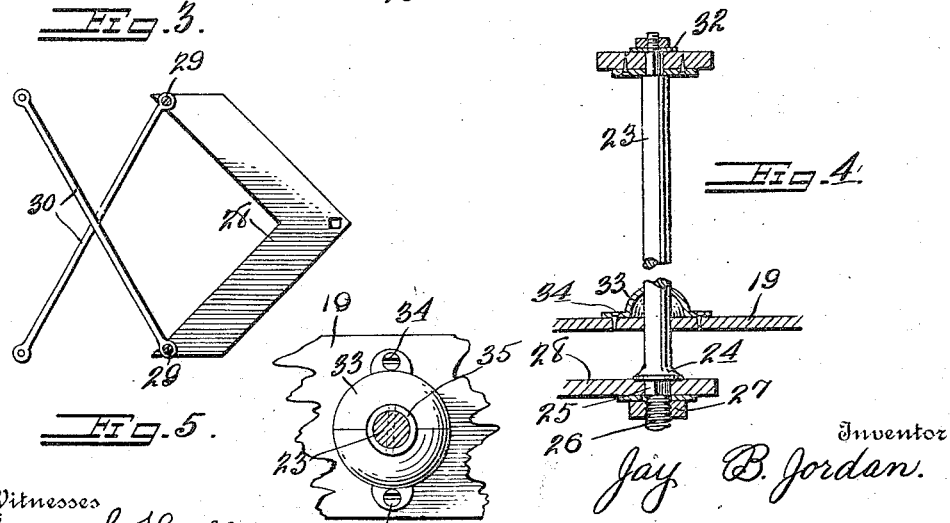
Witnesses
Edw. S. Hall.
Inventor
Jay B. Jordan.
By Richard B. Owen.
Attorney

UNITED STATES PATENT OFFICE.

JAY B. JORDAN, OF LOCK BERLIN, NEW YORK.

FLEXIBLE SLED.

1,226,672.  Specification of Letters Patent.  Patented May 22, 1917.

Application filed January 28, 1915. Serial No. 4,908.

*To all whom it may concern:*

Be it known that I, JAY B. JORDAN, a citizen of the United States, residing at Lock Berlin, in the county of Wayne and State of New York, have invented certain new and useful Improvements in Flexible Sleds, of which the following is a specification.

This invention relates to sleds, and more particularly those of the flexible variety which may be steered by the occupant of the sled in much the same manner as an automobile.

As a principal object, it is contemplated by this invention to provide a sled with novel steering means such that the driver will be enabled to get a greater leverage than is usually afforded making a steering of the sled more easily accomplished by children.

It is a further object to provide steering means for a flexible sled in which the forward runner tips may be warped simultaneously in the same direction by a movement exerting a pull on the one and a push on the other.

It is an object of equal importance with the foregoing to construct a simple and efficient steering means for sleds which may be constructed with such regard to proportion, number and arrangement of parts as to render the same capable of being cheaply manufactured as well as durable and efficient in operation.

The above and additional objects which will become apparent as this explanatory description proceeds are accomplished by such means as are illustrated in the accompanying drawings, described in the following specification and then more particularly pointed out in the claim which is appended hereto and forms a part of this application.

With reference to the drawings, wherein there is illustrated the preferred embodiment of this invention as it is reduced to practice, and throughout the several views of which like characters of reference designate similar parts:

Figure 1 is a side elevation of the sled comprehended by this invention,

Fig. 2 is a plan view of the matter shown in Fig. 1,

Fig. 3 is a detail plan of the steering connections removed from the sled,

Fig. 4 is a sectional view taken vertically through the steering wheel, and

Fig. 5 is a detail of the manner of mounting said steering wheel.

Sleds of the flexible variety are usually constructed with runners of a resilient steel enabling the forward portion thereof to be warped when it is desired to change the direction of the sled's course. Such runners are provided for the sled of this invention as indicated by the numeral 10 being formed in an inverted T-shape to provide the broader tread 11 and being arcuately upturned as denoted by the numeral 12 toward the forward portion of the sled. Cross knee supports 13 also preferably of metal are riveted or otherwise secured as at 14 to each runner 10 and are transversely connected by cross knees 15 longitudinally connected by the side bars 16 of the sled which extend forward for connection with the horizontal tip 17 of the upturned runner extremity 12, by means of the bolt 18. It also fastens a suitable cross brace enabling the runner tips to move as one. The sled top is made up of longitudinal strips 19 secured as indicated at 20 to the rearward cross knee 15 and to an intermediate cross piece 21, the latter of which is also secured to the side bars 16 and forms the terminus of the warping action of the runners. The top pieces 19 extend forwardly approximately the length of the sled and are further braced by a strap 22 positioned forwardly of the front cross knee upon which latter the strips 19 are slidable as a whole.

Extending through the center strip 19 and forwardly of the brace 22 is the vertical steering rod 23 formed adjacent its lower extremity with the upset portion 24 and the subsequent squared portion 25, terminating from this last portion onward in the bolt threads 26 upon which are received the nut 27 to maintain against downward displacement the bell crank steering lever 28 mounted on the squared portion 25. The arms of this bell crank 28 are substantially at right angles and are of equal length having secured at each extremity in the pivotal manner indicated at 29 steering links 30 adapted to cross each other and to be secured by the mentioned means 18 between the side bars 16 and the flattened extremity 17 of the runners 10. A steering wheel 31 is mounted as indicated at 32 in a manner substantially similar to the mounting of the bell crank 28 and at the opposite extremity of the rod 23 and is disposed at a sufficient height above the sled top strips 19 to permit of its being readily handled by the occupant of the sled in directing the course thereof. A split bearing 33 having equal half portions secured by means 34 to the center strip 19, surrounds the rod 23 and serves to support the same in its vertical position, to prevent binding of the steering connections, while a band 35 is secured to the steering rod by a cotter pin or other suitable means and is in contact with said bearing as shown in Figs. 1 and 5 to prevent vertical downward displacement of such rod.

In operation, the hand wheel 31 is twisted to rotate the steering rod 23 in the direction which the occupant of the sled wishes the latter to take. This rotation of the steering rod actuates the bell crank 28 in the same direction and causes one of the runner tips 17 to be pulled in that direction while the other is being pushed in the same direction, so that the force expended by the operator upon the hand wheel is divided equally by the bell crank and crossed connections 30 for exertion in like amounts upon each of the runners, which are thereby warped at their point of securement to the intermediate brace 21, as far as regards the sled top strips 19, as these latter freely overlie the forward cross knee. This simple structure also enables the operator to turn the wheel in the direction which he desires to take and obviates confusion arising from the opposite state of affairs.

From the foregoing therefore, it will be apparent that means have been disclosed whereby the objects previously presented may be readily accomplished so that this invention may therefore be claimed as possessing the advantages and desirability set forth in such objects.

What is claimed is:—

In a flexible sled, a pair of runners having upturned forward ends, supports connected to said runners and projecting upwardly therefrom, said supports being in rear of the upturned forward ends of the runner, cross braces secured to corresponding supports of the two runners, longitudinal brace bars fixed to said cross bars and to the forward upturned ends of the runners, a cross strip pivotally connected to said longitudinal braces and to the runners, a platform secured to the cross braces and terminating at its forward end in rear of the pivoted cross strip, a steering rod extending vertically through the longitudinal center of the platform, a two-part bracket supporting said steering rod, a bell crank lever rigidly connected to the lower end of the steering rod, the ends of said lever projecting toward the front ends of the sled and terminating laterally above the runners, and a rod connected to each end of said bell crank lever and extending across the sled to be pivotally connected to the forward end of the runner on the opposite side, the angle of such rods being such that upon turning the steering rod one of said cross rods will deflect a runner by pulling thereon while the other rod will cause a similar deflection in the same direction by pushing the same.

In testimony whereof I affix my signature in presence of two witnesses.

JAY B. JORDAN.

Witnesses:
  LULU B. JORDAN,
  JOSEPHINE B. JORDAN.